Sept. 30, 1924.
E. G. K. ANDERSON
1,510,027
ROTATIVE FRICTION JOINT
Filed June 9, 1921
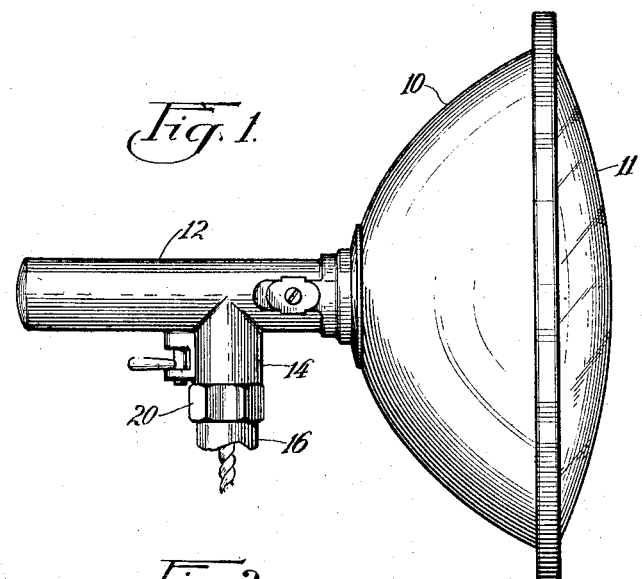
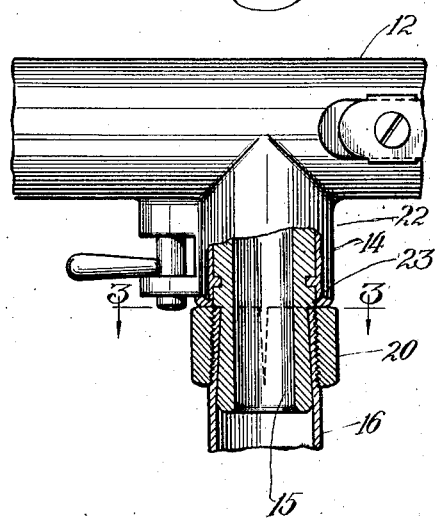
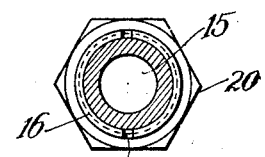
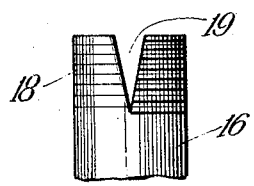
Inventor:
Ernst G. K. Anderson
William L. Hall
Atty.

Patented Sept. 30, 1924.

1,510,027

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

ROTATIVE FRICTION JOINT.

Application filed June 9, 1921. Serial No. 476,227.

*To all whom it may concern:*

Be it known that I, ERNST G. K. ANDERSON, a citizen of the United States, and a resident of Chicago, in the county of Cook and State of Illinois, have invented certain new and useful Improvements in Rotative Friction Joints; and I do hereby declare that the following is a full, clear, and exact description thereof, reference being had to the accompanying drawings, and to the characters of reference marked thereon, which form a part of this specification.

This invention relates to rotative joints between two parts, one of which is pivotally movable relatively to the other and the invention consists in the combination and arrangement of the elements shown in the drawings and described in the specification, and is pointed out in the appended claims.

The joint herein shown has been designed more particularly for use as one of the rotative joints of a spot or signal lamp mounting, wherein the mounting embraces two rotative joints operative in planes at right angles, so as to give universal movement to a lamp carried by one of the members of the mounting. Such a spot lamp mounting is shown in my companion application for United States Letters Patent, Serial Number 480,347 filed on the 25th day of June 1921, the joint being located between the rearwardly extending stem of the lamp casing and a vertical member which is connected through a second joint member to a bracket that has means of attachment to a fixed support, such, for example, as a post of a vehicle wind shield frame but can be adapted to other uses.

Among the objects of the invention is to produce a simple and reliable joint for thus connecting two relatively rotative parts of a universal lamp mounting or like structure, which is so constructed as to permit rotation of one part relatively to the other upon the application of moderate manual force, while holding the joint parts sufficiently tightened to avoid accidental displacement, due to vibration of the parts when adjusted.

A further object of the invention is to produce a rugged joint of few, readily made parts and a joint which is neat in appearance and occupies but little space.

In the drawings:

Figure 1 is a side elevation of a portion of a universally operable spot lamp provided with a rotative joint embodying my invention.

Figure 2 is an enlarged view of the parts shown in Figure 1, with portions in section to show the salient features of the invention.

Figure 3 is a horizontal section on the line 3—3 of Figure 2.

Figure 4 is an end view of a compressible tube constituting part of the joint and in this instance, the relatively fixed part thereof.

In said drawings, 10 designates the casing of a known form of spot lamp; 11 its lens, and 12 a rearwardly directed stem or hand piece that is fixed to the rear side of the casing centrally thereof, and by which the lamp can be manually directed. Said stem is preferably tubular and closed at its rear end to receive the switch mechanism by which the circuit of the lamp within the casing is controlled, and the joint constituting the present invention is hollow to allow for passage of the lamp cord to the chamber of the stem for attachment to the switch terminals.

14 designates a hollow stud which depends from the stem 12 and can be made integral with said stem. The stud is provided at its lower end with a reduced, axially extending tubular portion 15 for the passage of the lamp cord. The said reduced portion 15 of the tubular stud is exteriorly tapered, being of larger diameter at its lower end than at its upper end, where it joins with the main body of the stud. 16 designates a tubular member that constitutes one of the elements of the lamp mounting, and which, in practice, is connected by a second rotative joint to a fixed part of the mounting, and which cooperates with the joint herein shown to give universal swinging function to the lamp mounting. Said tubular member is provided at its upper end with external threads 18 and said threaded portion thereof is formed with V-shaped notches 19, the wider portions of which extend through the end margin of the tube at its upper end.

20 designates an internally tapered threaded nut which is adapted to be threaded over the upper threaded end 18 of the tubular member 16. The taper of the nut 20 is opposed to the taper of the reduced extension 15 of the hollow lug 14, the annulus of the nut being wider at its upper end than at its lower end, as shown in Figure 2.

Preferably and as shown in Figure 2, the reduced tubular extension 15 is formed on a tubular insert 22 that extends into the hollow stud 14, and the metal forming the hollow stud 14 may be cast around said insert. This construction permits said insert and its tubular extension to be made of steel, while the hollow lug and stem may be made of a softer metal. When so made a shoulder 23 is formed between the tubular insert and its extension at the point where the said extension emerges from the hollow stud.

In assembling the elements of the construction, the nut 20 is first placed over the extension 15 of said stud 14, or over the extension of the insert 22, when used, against the shoulder 23. Thereafter the slitted threaded end of the tubular member 16 is applied over the lower end of the reduced extension 15 to engage the internal threads of the nut at the lower end of the latter. The nut 20 and the hollow stud are held from rotation in any suitable manner, and the tubular member 16 is rotated to draw its threaded end into the space between the said nut 20 and the tapered extension 15 by the action of the cooperating threads on the nut and tubular member. Owing to the opposing tapers of the nut and the extension 15, the slitted, threaded end of the tubular member is contracted against the tapered face of said extension, as indicated in dotted lines in Figure 2. If the contracting faces of the tapered extension 15 and the tubular member are not pressed sufficiently together to hold the parts from free relative rotation after the upper end of the tubular member 16 strikes the shoulder 23, further compression of the slitted tubular member to produce the desired frictional contact may be effected by turning the nut 20 downwardly on the threaded end of said tubular member to produce the desired frictional contact between the tapered extension and the tubular member; the hand of the nut threads being in a direction favorable for further clamping action of the slitted part of said member on the tapered extension.

The coaction of the parts performs two important functions: one, to maintain the friction between the tapered extension and the tubular member sufficiently effective to avoid accidental angular displacement of the adjusted parts, while permitting said parts to be relatively rotated by the application of moderate manual power, and the other to prevent axial separation of the tubular member 16 and the stud 14.

It is evident that the joint is an exceedingly simple one, is made of but few parts, is sturdy, and is efficient to perform the function for which it has been designed.

I claim as my invention:

1. A rotative joint of the character described comprising two axially disposed joint members, the first of which is externally tapered and of greatest diameter at its free end and shouldered at the smallest diameter of the taper, and the second of which is tubular and end slitted to rotationally engage over the taper of the first member, and a nut threaded over the slitted part of said tubular member and interiorly tapered to oppose the taper of the first member and adapted to engage the shoulder of said first member for the purpose set forth.

2. In a universal mounting for spot lamps, the combination with a member having means to connect it to a lamp casing and provided with an axial extension having a frictional external taper, and formed at the smaller diameter of the taper with a shoulder, a second tubular member having an external thread and slitted end to frictionally and rotationally engage over said taper and adapted to engage at its end said shoulder, and a nut threaded on said slitted tubular member and having a taper opposed to the taper of said extension.

3. The combination with a spot lamp having a stem provided with a lug and having at its free end a reduced, externally tapered extension, with a shoulder between the smaller end of said tapered extension and the lug, a tubular member having a slitted, externally threaded end to frictionally and rotationally engage said extension, and a nut threaded over said threaded end of the slitted tubular member and having a taper opposed to that of said extension.

4. In a universal mounting for spot lamps, the combination with a stem adapted for connection to a lamp casing and having a lug, and an insert fixed in said lug and provided with an external tapered extension and with a shoulder between the larger taper of said insert and the smaller part of the extension, an externally threaded, slitted, tubular member adapted to be rotationally and frictionally fitted over said tapered extension and engaging at its end said shoulder, and a nut threaded to said second tubular member at its slitted portion and tapered to oppose the taper of said extension.

5. A universal mounting for spot lamps including a lamp controlling member provided between its ends with a lateral branch, a hard metal axially disposed insert in said branch, said insert having an externally tapered extension, a tubular member having an externally threaded end which is slitted through its margin and is rotatively and frictionally engaged over said tapered extension and a nut threaded over the threaded and slitted portion of said tubular member and having a taper opposing that of said extension.

6. A rotative tapered joint comprising axially disposed joint members and a nut, one of said joint members having a shouldered extension, externally tapered and the other joint member being tubular and frictionally and rotationally engaging over said tapered extension and slitted and externally threaded at its part abreast said taper, and a nut adapted to engage the shoulder of said extension threaded over the slitted end of said tubular member and having an internal taper opposed to the external taper of said extension.

7. A rotative tapered joint comprising axially disposed joint members and a nut, one of said joint members having an external taper and at the smaller end of said taper a shoulder, and the other joint member being tubular and externally threaded and slitted at one end to rotationally and frictionally engage over said taper, and a nut threaded over the slitted end of said tubular member abreast said taper and having a taper opposed to the joint member taper, said tubular member end and said nut being adapted to engage said shoulder.

In witness whereof I claim the foregoing as my invention, I hereunto append my signature this 7 day of June, 1921.

ERNST G. K. ANDERSON.